United States Patent
Bocchiola et al.

[11] Patent Number: 5,646,460
[45] Date of Patent: Jul. 8, 1997

[54] DEVICE FOR CONTROLLING HEATING ELEMENT POWER

[75] Inventors: Cesare Bocchiola, Settimo Milanese; Paolo Tenti, Padua; Leopoldo Rossetto, Caltana; Giorgio Spiazzi, Legnago, all of Italy

[73] Assignee: Whirlpool Europe B.V., Veldhoven, Netherlands

[21] Appl. No.: 536,226

[22] Filed: Sep. 29, 1995

[30] Foreign Application Priority Data

Sep. 30, 1994 [IT] Italy ................................. MI94A2006

[51] Int. Cl.⁶ ....................................................... H02J 3/00
[52] U.S. Cl. ................................................ 307/109; 219/482
[58] Field of Search ..................................... 307/109, 112, 307/125, 157; 315/241 S, 241 P, 244, 209 R; 219/482, 490, 501, 507–509; 323/222, 901; 361/251, 257, 266, 264; 310/1

[56] References Cited

U.S. PATENT DOCUMENTS 4,996,462  2/1991  Krummel ........................ 315/209 R
5,461,286  10/1995  Hirschmann ..................... 315/209 R

*Primary Examiner*—Richard T. Elms
*Attorney, Agent, or Firm*—Thomas A. Schwyn; Mark A. Davis

[57] ABSTRACT

A control device for heating elements, particularly for use in household electrical appliances such as cookers, cooking hobs, ovens and the like, comprising a driven switch in series with the, a first capacitor acting as a filter in parallel with the load, a second capacitor acting as a freewheeling capacitor operationally in series with the load and with the capacitor, these two being connected in parallel, and at least one inductor means in series with the load, characterised in that: a) the driven switch is a static switch hence able to assume an open state and a closed state; b) an inductor is provided in parallel with the load, or alternatively a section of the inductor means is in parallel with the load; c) a freewheeling diode is provided connected between an intermediate point between the inductor or section and freewheeling capacitor and an intermediate point between the load and static switch, so that when the static switch is in one state the freewheeling capacitor is charged via the freewheeling diode, the load and the inductor, whereas when in the other state the capacitor is discharged via the load, the inductor and the static switch.

4 Claims, 3 Drawing Sheets

DEVICE FOR CONTROLLING HEATING ELEMENT POWER

BACKGROUND OF THE INVENTION

1. Field of the Invention

This invention relates to a device for controlling the power of heating elements such as resistance elements, halogen lamps and the like, particularly for household electrical appliances such as cooking hobs, ovens and cookers. The control device is of the type described in the introduction to the accompanying main claim.

2. Description of the Related Art

It is well known that the power of a heating element, particularly for household electrical appliances, can be continuously controlled by switching devices, particularly of the type known as buck converters, which produce a controllable output voltage starting from an a.c. source after rectifying and filtering the relative a.c. voltage, and controlling the on/off time ratio of a solid state switch.

The basic scheme of such a device is shown in FIG. 1, in which a rectifier bridge DB and the capacitive input filter CF provide a d.c. voltage Vin from an a.c. source Vac.

The solid state switch S, shown for ease of representation as a static switch, converts the d.c. voltage Vin at the point 1 into a high frequency pulsating voltage, the mean value of which is less than or equal to Vin. The pulsating voltage is then filtered by the capacitive/inductive filter L0 +C0 to obtain a d.c. voltage across the ends of the heating element, here represented by the resistance element R1.

The main drawback of such a device is the production in the mains network of a pulsating current both at low frequency (by the effect of the input capacitor CF) and at high frequency (switching frequency) by the action of the switch S. This means that costly and bulky passive filters have to be connected into the mains network, which apart from their cost reduce the efficiency of the conversion process.

A particular power converter arrangement is also known which enables the same power level required for the particular application to be supplied, but with a reduced amplitude of the pulsating current at the input to the converter stage. Such an arrangement is widely described in U.S. Pat. Nos. 4,184,197, 4,186,437, 4,257,087, 4,274,133 and 4,654, 769. In particular, U.S. Pat. No. 4,274,133 describes a possible modification of this arrangement which provides a step-down transfer function. For completeness, this latter prior art arrangement is reproduced in the accompanying FIG. 2. The inductors L1 and L2 can be either coupled or not coupled together. This known arrangement has the intrinsic advantage of reducing the input EMI in the voltage source and the output EMI in the load, mainly if the inductors L1 and L2 (of FIG. 2) are coupled with a defined coupling factor. However this described known converter must be fed with a pure d.c. voltage, as represented by the battery Vg, i.e. with an undulation-free voltage, this requiring the use of further costly filters if a rectifier bridge is used to provide the d.c. voltage from the mains.

SUMMARY OF THE INVENTION

An object of the present invention is to provide a particular arrangement for controllably converting the power of an a.c. source into power for feeding a heating element, in particular for household electrical appliances, the arrangement being distinguished by low EMI in the a.c. source, unit power factor, simplicity (significant for low cost) and high efficiency, this being particularly important when high power levels (ranging from some hundreds of watts to a few kilowatts) are involved.

This and further objects which will be apparent from the detailed description given hereinafter are attained by a control device in accordance with the accompanying main claim.

DESCRIPTION OF THE PREFERRED EMBODIMENT

Figure 1:
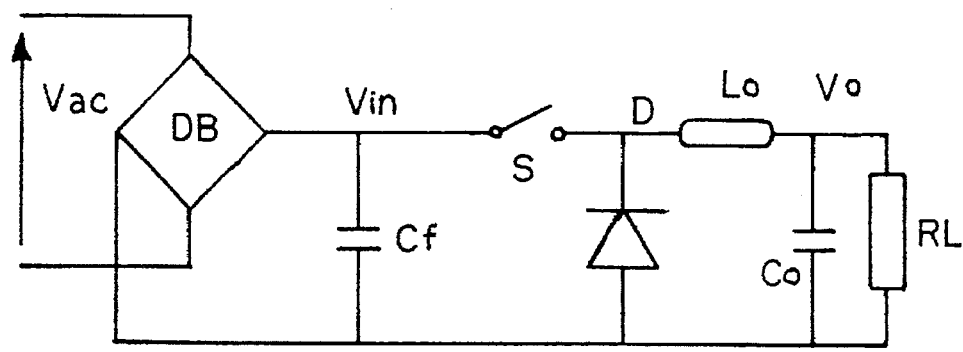
FIG. 1 illustrates an electrical schematic for a prior art power converter.
Figure 2:
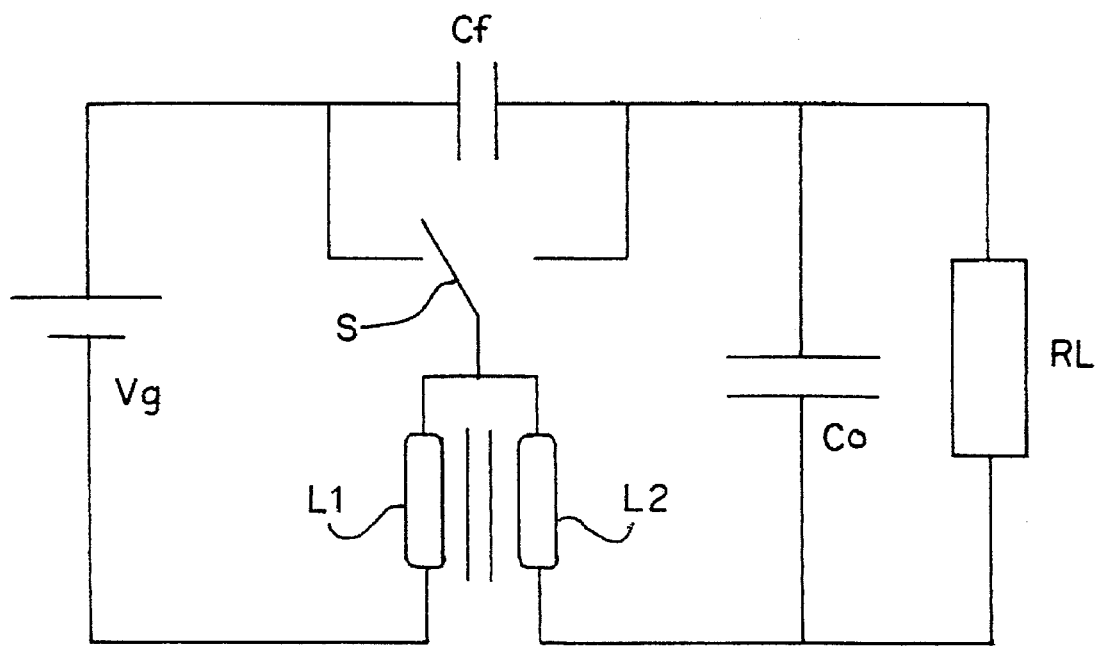
FIG. 2 illustrates an electrical schematic for another prior art power converter.
Figure 3:
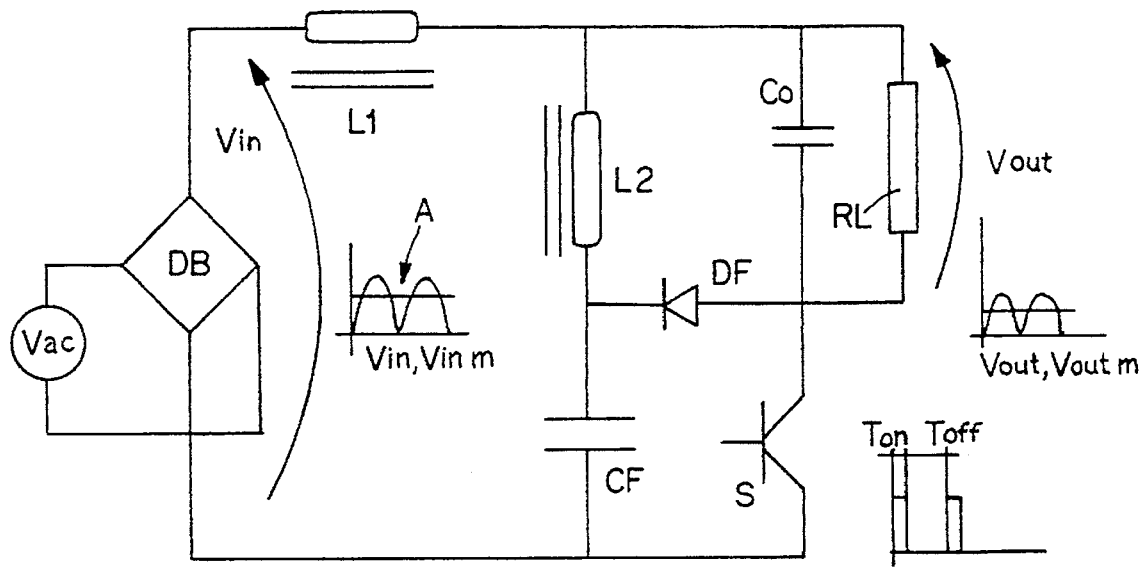
FIG. 3 illustrates an electrical schematic for a first embodiment of the power converter according to the invention.
Figure 4:
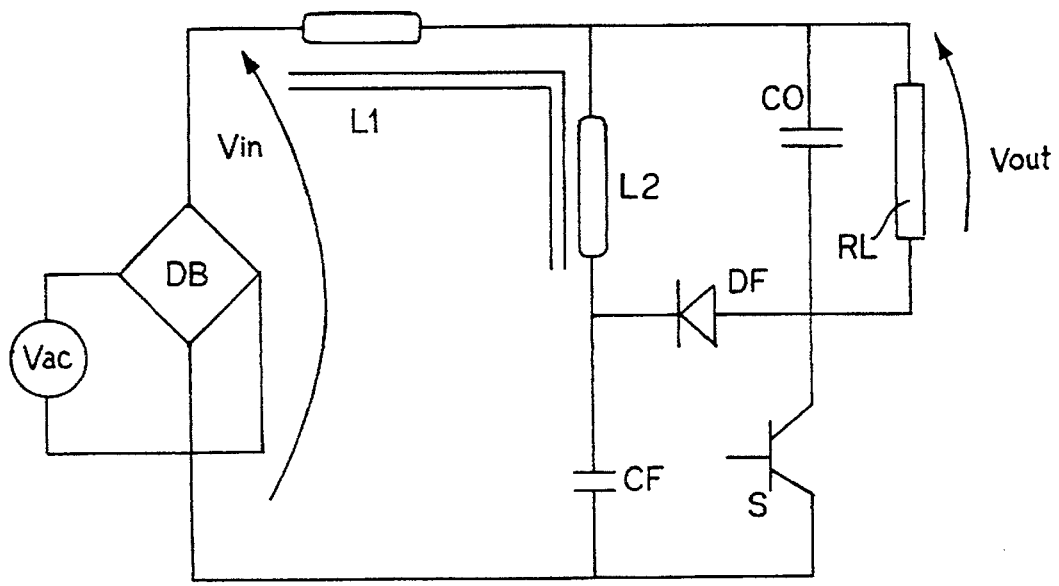
FIG. 4 illustrates an electrical schematic for a second embodiment of the power converter according to the invention.
Figure 5:
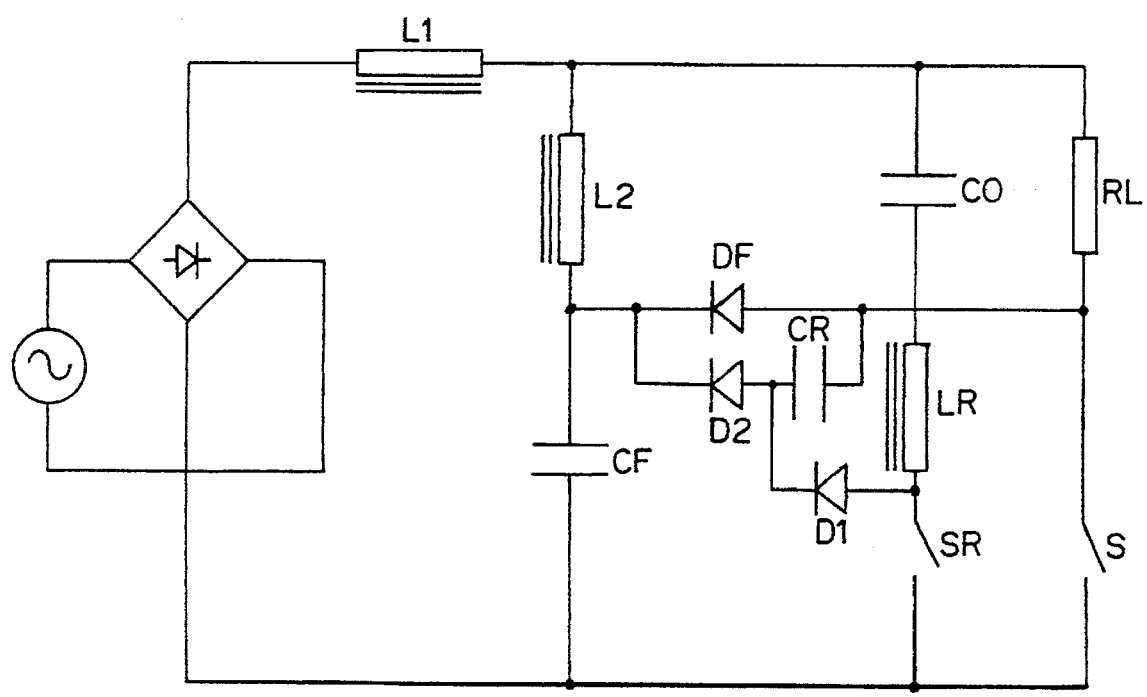
FIG. 5 illustrates an electrical schematic for a third embodiment of the power converter according to the invention.

The invention will be more apparent from the ensuing detailed description, provided by way of non-limiting example, of three preferred embodiments shown in the electrical schematics of FIGS. 3–5 of the accompanying drawing respectively, in which FIGS. 1 and 2 show the electrical schematics of the two known devices described heretofore.

With reference to FIG. 3, Vac indicates the a.c. supply source connected to a rectifier bridge DB, the unfiltered d.c. output voltage of which is indicated by Vin and which is shown in diagram A both as a whole wave (Vin) and as a mean value (Vm). The output of the bridge DB is connected to an iron-core inductor L1. In parallel with the bridge DB and the inductor L1 there are a second iron-core inductor L2 and a capacitor CF and in another parallel branch a capacitor CO and a static switch S. The two parallel branches are connected together in an intermediate position by a diode DF. The resistive load element RL is connected in parallel with the capacitor CO, this parallel arrangement being connected in series with the static switch S. The voltage Vout, also shown in whole form and as a mean value, Vm out, to the right of the drawing, is applied to the load. The transistor S represents an example of a static switch, at the base of which the control signal Ton-Toff operates, this being shown to the right of the schematic and being provided by any known driver circuit.

The arrangement of FIG. 4 differs from that of FIG. 3 only in that the two inductors are coupled by the common iron core and can be in the form of a single inductor with an intermediate tap.

Furthermore it is foreseen an additional part of the circuit, as shown in FIG. 5, in order to improve the performances of the device. The circuit elements such as an inductor LR in series with a supplementary static switch SR are a further parallel branch of the static switch S. A second branch is in parallel to the freewheeling diode DF, consisting of a diode D2 in series with a capacitor CR. The two additional branches are connected together in an intermediate position by a diode D1.

In all cases the a.c. source Vac (preferably mains voltage) is rectified by the bridge DB. The voltage Vin is in a rectified state after the bridge but is not smoothed and has a mean value of $2/\pi$ of the maximum voltage value of the a.c. source.

The voltage Vout applied to the load RL is also a rectified but not smoothed d.c. voltage (as shown by the relative diagrams of FIG. 3), but its mean value is less than or at most equal to the mean value of Vin (i.e. Vin m) depending on the ON/OFF time ratio of the static switch S, which is shown as a transistor (see diagram to the left of the switch 3 in FIG. 3). In this manner by controlling the ON/OFF time ratio of the switch S the voltage across the heating element RL can be controlled, this voltage varying from zero to Vin. The power supplied to RL is consequently controlled between 0 and the square of the effective value of Vin divided by RL.

The pulsating current produced by the switching of the static switch S is filtered out by the two inductors L1 and L2, which can also be coupled (FIG. 4) to further reduce undulation. It should be noted that the current in the load RL is pulsating, but this does not constitute a problem given the resistive nature of the load. In any event, by suitably choosing the value of the smoothing capacitor C0 the current pulsation in the load can be reduced to an acceptable level.

The utilisation factor (ON/OFF time ratio) of the switch S is maintained constant as is the switching frequency for each desired power level fed to the load RL. In this manner the current circulating within the source Vac (i.e. within the a.c. mains feeding the converter) will be sinusoidal because with a constant utilisation factor the converter behaves as a fixed impedance (practically as a resistor) in the eyes of the a.c. source Vac, hence providing a practically unitary power factor.

The device is of simple configuration in that it requires only a static switch S (which can be a transistor, a power MOS or the like), a freewheeling diode (DF), two small capacitors (C0 and CF) and two inductors (which can be reduced in practice to one by being coupled together and providing a simple intermediate tap). As a result it is of low-cost construction and hence particularly suitable for use in household electrical appliances.

It should be noted that by suitably choosing the values for the capacitor CF and the inductors L1 and L2 it is possible to make S turn on and the freewheeling diode DF correspondingly turn off for zero current passage. This means that switching losses in the semiconductor switches are strongly reduced.

Alternatively a further reduction of the switching losses generating the pulsating current to the mains network can be obtained via the arrangement of FIG. 5. In the configuration the additional static switch SR is switched on before the static switch S is switched on, and it is kept on for a further short time and then switched off. Afterwards the static switch S is switched off according to the power requirement, hence the current of the freewheeling diode DF and the charge of the eddy capacitor related to the static switch S are reduced to zero before the static switch S is activated.

The final result of the proposed configurations are a sum of benefits leading to overall simplicity, very high efficiency, unit power factor and reduced EMI in the a.c. supply source.

As already stated, the circuit enables large capacitances at the output of the rectifier bridge to be dispensed with and a unit power factor to be obtained for a constant utilisation factor.

We claim:

1. A control device for heating elements, comprising:
    a driven switch in series with the load;
    a first capacitor acting as a filter in parallel with the load;
    a second capacitor acting as a freewheeling capacitor operationally in series with a parallel circuit comprising the load and the first capacitor; and
    at least one inductor means in series with the load, wherein:
    a) the driven switch is a static switch hence able to assume an open state and a closed state;
    b) a first inductor is provided in parallel with the load; and
    c) a freewheeling diode is connected between an intermediate point between the first inductor and the freewheeling capacitor and an intermediate point between the load and the static switch, so that when the static switch is in one state the freewheeling capacitor is charged via the freewheeling diode, the load and the at least one inductor means, whereas when in the other state the capacitor is discharged via the load, the first inductor and the static switch.

2. A control device for heating elements as claimed in claim 1, and further comprising an additional first branch consisting of a second inductor in series with a supplementary static switch which is able to assume an open state or a closed state, said second inductor and said supplementary static switch being in parallel to the driven switch, and a second additional branch consisting of a first diode in series with a capacitor and in parallel to the freewheeling diode, and in that the first diode and the capacitor are connected together in an intermediate position by a second diode; providing that the supplementary static switch is switched on before the driven switch is switched on and while the supplementary static switch is still kept on and then switched off, afterwards the driven switch is switched off, in such a way that a current of the freewheeling diode and a charge of an eddy capacitor related to the driven switch are reduced to zero before the driven switch is activated.

3. A control device for heating elements, comprising:
    a driven switch in series with the load;
    a first capacitor acting as a filter in parallel with the load;
    a second capacitor acting as a freewheeling capacitor operationally in series with a parallel circuit comprising the load and the first capacitor; and
    at least one inductor means in series with the load, wherein:
    a) the driven switch is a static switch hence able to assume an open state and a closed state;
    b) a first inductor that is a section of the at least one inductor means is provided in parallel with the load; and
    c) a freewheeling diode is connected between an intermediate point between the first inductor and the freewheeling capacitor and an intermediate point between the load and the static switch, so that when the static switch is in one state the freewheeling capacitor is charged via the freewheeling diode, the load and the at least one inductor means, whereas when in the other state the capacitor is discharged via the load, the first inductor and the static switch.

4. A control device for heating elements as claimed in claim 3, and further comprising an additional first branch consisting of a second inductor in series with a supplementary static switch which is able to assume an open state or a closed state, said second inductor and said supplementary static switch being in parallel to the driven switch, and a second additional branch consisting of a first diode in series with a capacitor and in parallel to the freewheeling diode, and in that the first diode and the capacitor are connected together in an intermediate position by a second diode; providing that the supplementary static switch is switched on before the driven switch is switched on and while the supplementary static switch is still kept on and then switched off, afterwards the driven switch is switched off, in such a way that a current of the freewheeling diode and a charge of an eddy capacitor related to the driven switch are reduced to zero before the driven switch is activated.

* * * * *